J. E. JONES.
LIVE STOCK OILER.
APPLICATION FILED AUG. 12, 1914.

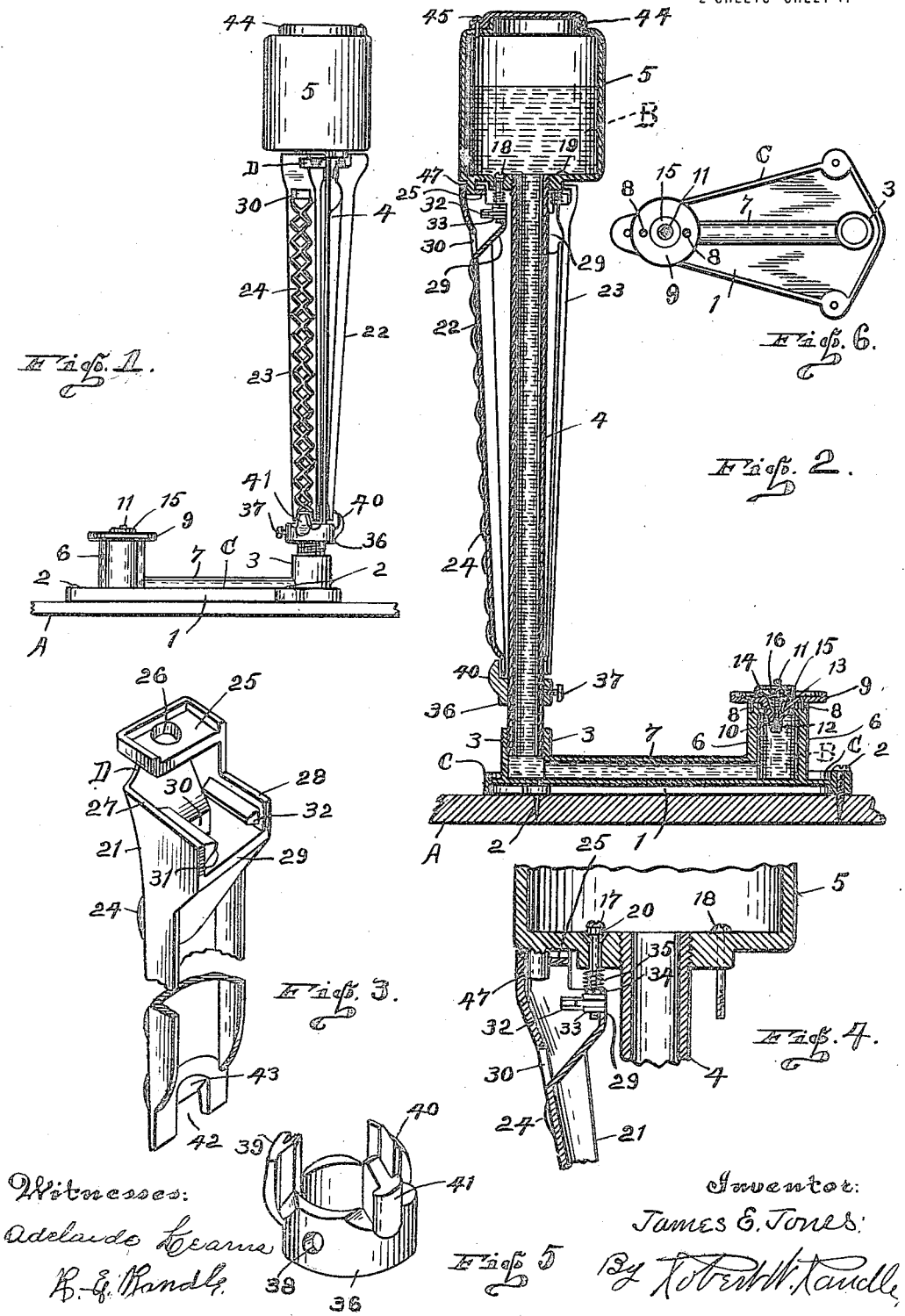

1,151,883.

Patented Aug. 31, 1915.
2 SHEETS—SHEET 2.

Witnesses:
Adelaide Kearns.
R. E. Randle.

Inventor:
James E. Jones;
By Robert W. Landle,
Attorney

UNITED STATES PATENT OFFICE.

JAMES E. JONES, OF RICHMOND, INDIANA, ASSIGNOR TO NATIONAL FACTORIES INCORPORATED, OF RICHMOND, INDIANA, A CORPORATION OF INDIANA.

LIVE-STOCK OILER.

1,151,883.

Specification of Letters Patent. Patented Aug. 31, 1915.

Application filed August 12, 1914. Serial No. 856,320.

*To all whom it may concern:*

Be it known that I, JAMES E. JONES, a citizen of the United States, residing in the city of Richmond, in the county of Wayne and State of Indiana, have invented a new and useful Live-Stock Oiler, of which the following is a full, clear, and comprehensive specification, the same being such as will enable others to make and use the same with exactitude.

The object of my present invention, broadly speaking, is to produce an oiler for live stock, but particularly intended for oiling swine or hogs, the construction of which will be strong and durable, practically automatic in its operation, positive in action, not liable to become inoperative through wear, not affected by exposure to the weather, and which can be manufactured and sold at a comparatively low price.

The particular object in view is to provide a construction of the nature set forth whereby the flow of oil to and over the animal is adapted to be controlled by the animal, and whereby a small hog, or pig, may operate the device as effectually and with the same results as a larger animal. And another object is to provide means whereby there will be no discharge and consequent loss of oil when no animal is in contact with the device. Other minor objects and particular advantages of my invention will be brought out in the course of the following specification.

The preferred means for carrying out my invention in a practical manner is shown in the accompanying drawings, in which—

Figure 7:
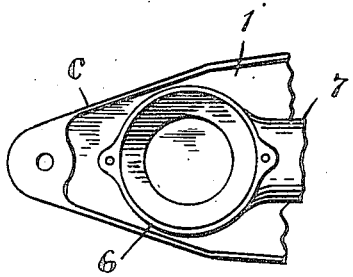
Figure 8:
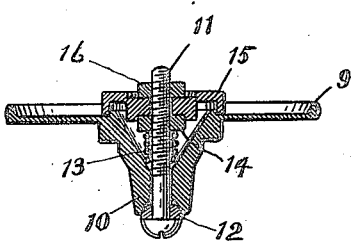
Figure 9:
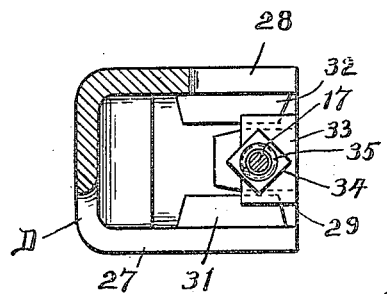
Figure 10:
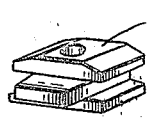
Figure 11:
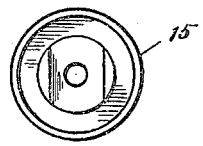

Figure 1 is a side elevation of my invention complete and in operative position. Fig. 2 is a vertical central section of the invention, as taken on an enlarged scale from that of Fig. 1. Fig. 3 is a perspective detail view of one of the arms alone, showing the inner side thereof, the central portion being broken away, the three arms being identical with each other. Fig. 4 is an enlarged detail vertical section, particularly intended for showing the valve construction. Fig. 5 is a perspective view of the retaining collar alone, the same being intended for retaining the lower ends of the arms in operative position. Fig. 6 is a plan view of the base of the device. Fig. 7 is an enlarged detail view of the smaller end portion of the base, the disk and the valve of the base oiler being removed. Fig. 8 is a vertical section, taken through the base-oiler valve, the same being the parts of the base oiler omitted from Fig. 7. Fig. 9 is a plan view, partly in section, of the upper end of one of the arms, the same being taken horizontally through one valve stem, and showing a plan view of one of the sliding blocks. Fig. 10 is a perspective view of one of the sliding blocks alone. And Fig. 11 is a plan view of the small disk of the base oiler without the neighboring parts in connection therewith.

Similar indices denote like parts throughout the several views.

In order that the construction, the operation, and the advantages of my invention may be thoroughly understood I will now take up a detailed description thereof in which I will set forth the invention as briefly and as comprehensively as I may.

Referring now to the drawings in detail: Numeral 1 denotes the base or plate which is adapted to be secured to a floor or platform A, as by bolts or screws 2. Extending up from one end of the base is the circular flange 3, into which is threaded the lower end of the pipe 4. Secured on the upper end of the comparatively large pipe 4 is the tank 5. Also rising from the base, on the opposite end thereof from the flange 3, is the larger flange 6. Extending along on the base and connecting the interiors of the lower ends of the flanges 3 and 6, is the pipe 7 which is preferably formed integral with the base and with the flanges 3 and 6. Secured on the top of the flange 6, by means of the screws 8, is the disk 9. Extending down from the center of the disk 9 into the flange 6 is the hollow stem 10. Extending upward through the stem 10, and freely operative therein, is the bolt 11. There is a resilient gasket 12 disposed around said bolt and located between the head of the bolt and the lower end or bottom of the stem 10. Also disposed around the bolt 11 is the helical spring 13, which is seated in the lower part of the interior of the stem 10. Threaded on the bolt 11 is the lower nut 14 with which the upper end of said spring engages whereby the spring normally retains the valve closed, that is it retains the bolt 11 upward with the gasket 12 tightly in contact with the lower end of the stem 10. Mounted on the upper portion of the bolt 11 and located slightly above the disk 9 is the small disk 15 which contacts with the nut 14. The disk 15 is retained in place by the nut 16 which is threaded on the upper end of the bolt 11.

The means for discharging from the tank 5 is formed in triplicate, and as the means are the same therefore a description of one will answer for all, thereby preventing this description from being unnecessarily prolix. Formed around through the bottom of the tank 5 are three vertical apertures which are formed flaring at their upper ends. Extending down through each of said apertures is a bolt, as the bolts 17, 18 and 19. Disposed around each of said bolts and contacting with the heads thereof is a packing washer or gasket, as the gasket 20 shown in Fig. 4, the same being adapted to close said apertures.

Numerals 21, 22 and 23 denote the three arms, which are comparatively long and have rounded outer faces, from which project the zigzag retardants or ribs 24, as shown most clearly in Fig. 1. The head or upper end portion of each of the said arms is formed as shown in Figs. 3 and 4, whereby a partition 25 is formed in which there is a round aperture 26 (Fig. 3) to receive the pintle 47, as in Fig. 4. The three pintles 47 extend down from the underside of the bottom of the tank 5 and they are located near the periphery thereof and may be integral therewith.

Located below and inward from the partition 25 are the shoulders 27 and 28, and extending downward and outward from the inner ends of said shoulders, commencing below the inner corners thereof, is the deflector 29 which forms a pocket. Opening through the face of the arm at the bottom of said pocket is a slot 30 which is located at the upper ends of the ribs 24. Formed horizontally across the inner faces of the shoulders 27 and 28 are the guide-lugs 31 and 32 respectively. Mounted to slide backward and forward on the lugs 31 and 32 is the block 33 which has a threaded aperture formed centrally therethrough in which is threaded the lower end of the bolt 17, for instance. Also threaded on the bolt 17 immediately above the block 33 is the adjusting nut 34. And located around the bolt 17 is the helical spring 35, the same being seated against the nut 34 and the bottom of the tank 5, whereby the said spring normally presses the bolt 17 down, thereby closing the valve.

Numeral 36 denotes a collar which is adjustably secured to the pipe 4 by the set-screw 37 which is threaded into the aperture 38. Extending upward from the collar 36 are three fingers 39, 40 and 41, which are T-shaped in cross-section with the heads thereof directed outward, and with their upper ends beveled outwardly and downwardly, as shown in Fig. 5.

In the lower end of each of the arms 21, 22 and 23 is a notch 42 shown in Fig. 3. The upper end of each notch is formed beveled, as shown at 43 in Fig. 3, the said bevel being adapted to engage with the upper end of the finger 39 for instance.

After the upper ends of the arms are secured, as set forth, the lower ends thereof may be gathered inward around the pipe 4, the collar 36 is then slid upward and secured by the set-screw 37, which will allow the fingers to be located in the notches 42, and the lower ends of the arms will be prevented from swinging outward, beyond a certain limit, by reason of the heads of the fingers with which the arms on each side of the notch 42 engages.

A cap 44 is adapted to cover the opening in the upper end of the tank 5, said cap being detachably secured by the set-screw 45.

Rising from around the edge of the base 1 is a flange C, thereby making the top of the base capable of containing surplus oil.

It will be noticed that a notch D is formed in one side of each of the arms, the same being located between the partition 25 and the shoulder 27, the purpose of which is simply to afford access for the adjustment of the nut 34, or other parts as desired.

It will now be evident that if the device be arranged and provided with oil as shown, that normally all of the valves will be closed, thereby retaining the oil B in the tank. However should a hog or other animal attempt to rub or scratch itself against the device, as they will be inclined to do, then as the arm, or arms, engaged by the animal is pressed inward and raised slightly upward the oil will be released and will drop on the deflector 29 and run out through the slot 30, and from there will trickle down the face of the arm, upon which it will be distributed laterally by the ribs 24, thereby causing it to come into contact with and be distributed over the animal as it rubs against the arms.

As will be noticed the oil B is contained in the tank 5, also filling the pipes 4 and 7 and the flange 6.

It is also evident that if an animal should apply weight to the disk 15 that oil will be released onto the flanged disk 9, from which it will be distributed over the underside of the animal as it contacts therewith.

One of the novel features of this invention lies in the fact that the tank valves are more easily operated when pressure is applied to the lower portions of the arms than when it is applied nearer their upper portions, thereby permitting the small animal to operate the device as readily as a larger one. The reason for this is that in order to operate the valves the arms must be pressed inward and raised upward. This movement is provided for by the bevel 43 engaging the upper end of one of the fingers of the collar 36, from which it will be seen that as the arm is pressed inward it will necessarily be raised, and it is evident that this movement may be attained more easily when the pressure is applied as near as possible to the lower end of the arms, and it is evident that the smaller animal will apply the necessary pressure nearer this point, thereby permitting the smaller animal to operate the device as easily as the larger animal.

I desire that it be understood that various changes may be made in the several details of construction herein set forth without departing from the spirit of my invention and without sacrificing any of the advantages thereof which are new and useful.

Having now fully shown and described my invention, what I claim and desire to secure by Letters Patent of the United States, is—

1. A live stock oiler comprising a base, a tank located above the base, a hollow standard connecting one end of the base to said tank, there being a plurality of apertures formed through the bottom of the tank and located an equal distance from the center of the tank and from each other, a valve for each of said apertures, a spring normally closing each valve, an arm extending down from each valve and each suspended from its respective valve with their lower ends spaced around the lower portion of said standard, and a collar for retaining the lower ends of the arms in operative position, all substantially as set forth.

2. A live stock oiler comprising a base, a tank located above the base, a standard connecting the base and the tank, there being a plurality of apertures formed through the bottom of the tank, an upwardly opening valve adapted to close each of said apertures, a spring for each valve to normally retain their respective valves closed, an arm suspended from each valve and extending downward to the lower portion of the standard and spaced therearound, a pintle for the upper end of each arm to form a guide therefor, the said pintles extending down from the bottom of the tank, a collar adjustably secured around the lower portion of the standard and adapted to prevent the lower ends of the arms from swinging outward beyond a predetermined distance, and an incline carried by the collar for each of said arms and which are adapted to cause the arms to be lifted when they are pressed toward the standard, all substantially as shown and described.

3. A live stock oiler comprising a base, a tank located above the base, a hollow standard connecting the tank and one end of the base, there being an aperture in the center of the tank leading into said standard, valves located in the bottom of the tank at points remote from said standard, arms extending down from said valves to near the base, means whereby each of the said arms will be lifted when they are pressed toward the standard to open the respective valves, a deflector for conducting oil released by opening said valves outward to the faces of the arms, a valve located at the opposite end of the base from the standard, a disk carried by the last mentioned valve and adapted to open the last mentioned valve when said disk is pressed downward and allow oil to discharge onto said disk, a spring normally retaining the last mentioned valve closed and the said disk raised to its upward limit of movement, and a pipe connecting the lower end of the standard with the last mentioned valve, all substantially as set forth.

4. A live stock oiler comprising a base, flanges 3 and 6 extending upward from the base, means for interiorly connecting said flanges, a pipe extending upward from flange 3, a tank mounted on the upper end of said pipe, valves located in the bottom of the tank, an arm suspended from each of said valves, a collar surrounding the lower portion of said pipe and retaining the lower ends of the arms in operative position, means carried by the collar for causing said arms to be raised when they are pressed toward the pipe, a valve located in the upper end of the flange 6 and adapted to release oil when it is pressed downward, all substantially as set forth.

5. A live stock oiler, comprising a base, a standard extending up from the base, a tank mounted on the upper end of the standard, there being apertures formed through the bottom of the tank and located near the standard, a bolt extending downward through each of said apertures, a washer adjoining the head of said bolt and adapted to close the aperture in which the bolt is located, a pintle extending down from the underside of the tank and located outward from said aperture, an arm slidable up and down on said pintle, shoulders extending inward from the upper portion of the arm, guide-lugs located on the inner faces of the shoulders, a block slidable horizontally on said guide-lugs, the said block being threaded on the lower portion of said bolt, a nut threaded on said bolt and located over said block, a coil spring surrounding the bolt and pressing against said nut and the bottom of the tank, and a deflector for conducting oil, which may be released by said valve, to the face of the arm, all substantially as shown and described.

6. A live stock oiler comprising a base having a wide end which tapers to an opposite narrow end, a flange 3 extending up from the center of the wide end of the base, a hollow standard secured in and extending up from flange 3, a tank secured on the upper end of said standard and having interior communication therewith, a flange 6 extending up from the center of the narrow end of the base, a pipe connecting the flanges 3 and 6, a disk 9 secured horizontally on the top of flange 6, a hollow stem extending down into the interior of the flange 6 from the center of the disk 9, a bolt extending up through said stem, a gasket in contact with the head of the bolt and adapted to close the lower end of the aperture through said stem, a helical spring disposed around said bolt and seated in the interior of the stem, the lower nut 14 threaded on said bolt and with which the upper end of said spring contacts, a small disk 15 mounted on said bolt and located above the disk 9, a nut 16 threaded on said bolt to hold the disk 15 in position, and means for securing the base to a floor, substantially as described.

7. A live stock oiler comprising a base, a standard extending up from the base, a tank secured on the top of the standard, there being a plurality of upwardly flaring apertures formed through the bottom of the tank and each having in connection therewith: a bolt extending down therethrough, a gasket contacting with the head of the bolt and adapted to close its aperture in the bottom of the tank, a nut threaded on said bolt, a helical spring located around said bolt and seated against said nut and the bottom of the tank, a block 33 threaded on said bolt and located immediately below said nut, an arm suspended from the block 33 and extending down near said standard, and means for conveying oil, which may be released through said aperture, to the face of the arm and distributed thereover by gravity, all substantially as set forth.

In testimony whereof I have hereunto subscribed my name to this specification in the presence of two subscribing witnesses.

JAMES E. JONES.

Witnesses:
R. E. RANDLE,
R. W. RANDLE.